United States Patent Office 3,641,105
Patented Feb. 8, 1972

3,641,105
PROCESS FOR PRODUCTION OF ADIPONITRILE
Yasuhisa Hashiguchi and Sueo Kamada, Nobeoka-shi, Japan, assignors to Asahi Kasei Kogyo Kabushiki Kaisha, Osaka, Japan
No Drawing. Filed Feb. 13, 1969, Ser. No. 799,096
Claims priority, application Japan, Mar. 26, 1968, 43/19,184
Int. Cl. C07c 121/26
U.S. Cl. 260—465.8 A                        6 Claims

ABSTRACT OF THE DISCLOSURE

A process of producing adiponitrile with excellent yield by using a reacting liquid containing organic halides in order to oppress the side reaction in cyanoethylation when the acrylonitrile is going to be reduced and dimerized by the amalgam of alkaline metal or amalgam of alkaline earth metal in a water soluble organic solvent.

---

This invention relates to a process for producing adiponitrile by reduction and dimerization of acrylonitrile using amalgam of alkaline metal or alkaline earth metal.

There have been found recently several patents in the process for producing adiponitrile by the amalgam method, for example, Japanese patent publication 12,912, 1963; Japanese patent publication 2,415, 1965; Belgian Pat. 689,114; and Belgian Pat. 691,282. In these patents, the adiponitrile is produced by reducing and dimerizing the acrylonitrile which is dissolved in dimethylsulfoxide, dimethylformamide or quaternary ammonium salt by using the amalgam of alkaline metal or amalgam of alkaline earth metal in the presence of water.

If the reactions above-mentioned are carried out in acid solutions, it is advantageous to obtain less by-product resulting from cyanoethylation in the reaction, but on the other hand, the rate of utilization of hydrogen (hereinafter called "amalgam efficiency") as consumed effectively in the reaction of producing adiponitrile becomes lower. In addition, the reactions in acid solution have the defect of being prone to produce propionitrile, another by-product. Also it is not easy to adjust the pH value of the reacting liquid.

If the reaction is carried out in an alkaline solution, it is advantageous to have an easy control on the value of pH of the solution in the reaction owing to the carbon dioxide introduced into the solution, and less propionitrile is produced by which the amalgam efficiency of the reaction is raised. On the other hand, however, by-product in cyanoethylation is prone to be produced, especially at a temperature over 30° C. whereat the rate of production of by-product in cyanoethylation sharply increases.

The reactions producing adiponitrile and by-products are shown in the following formulas:

Main reaction—adiponitrile—

$$2CH_2{:}CHCN + 2H \rightarrow CN(CH_2)_4CN \qquad (1)$$

Side reaction—propionitrile—

$$CH_2{:}CHCN + 2H \rightarrow CH_3CH_2CN \qquad (2)$$

Side reaction—biscyanoethyl ether

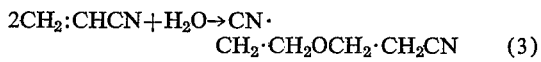

$$(3)$$

The inventors of the present invention have finally succeeded in obtaining adiponitrile in excellent yield by reducing production of by-products in cyanoethylation, mainly biscyanoethyl ether, which have been understood as the defect of the reaction performed in the alkaline solution after their research in the reactions concerned.

The process for producing the adiponitrile in excellent yield has been accomplished by the inventors of the present invention by controlling the side reaction in cyanoethylation and by maintaining the high concentration of the produced adiponitrile in the reacting liquid wherein the organic halide was contained.

The quantity of the hydrogen generating out of the amalgam becomes less and the quantity of the polymerization product becomes less in the conventional process for producing the adiponitrile if the quantity of water in the reacting liquid is less than the optimum quantity. Taking for example, the optimum quantity of water required for ranges from 0.8 part to 1.0 part by weight for 2 parts of dimethylsulfoxide and 1 part of acrylonitrile. The optimum pH value of the reacting liquid ranges from 8 to 11. The quantity of produced biscyanoethyl ether will increase when the pH value is higher than the range of optimum pH value above-mentioned. On the contrary, decrease in amalgam efficiency and increase in the quantity of produced propionitrile will result from a pH value lower than the optimum pH value.

Results of tests carried out at various temperatures, taking 0.9 part of water and at the pH values ranging from 8 to 10 are shown in the following table:

TABLE I

| Reaction temperature in °C. | Quantity of— | | | Percent | |
|---|---|---|---|---|---|
| | Produced adiponitrile | Produced propionitrile | Produced biscyanoethyl ether | Amalgam efficiency | Yield of adiponitrile |
| 20 | 0.33 | 0.01 | 0.015 | 91 | 93 |
|    | 0.70 | 0 01 | 0.05 | 91 | 92 |
| 30 | 0.33 | 0.01 | 0.03 | 90 | 89 |
|    | 0.70 | 0.01 | 0.10 | 90 | 86 |
| 40 | 0.33 | 0.01 | 0.07 | 84 | 80 |
|    | 0.70 | 0.01 | 0.25 | 84 | 73 |

It is clearly understood that the yield of adiponitrile decreases when the produced quantity of adiponitrile increases and the reaction temperature rises. Decrease in yield of adiponitrile results from by-production of biscyanoethyl ether. However, the quantity of the produced propionitrile does not vary so much. Also the amalgam efficiency changes only a little. As stated above, the process of producing adiponitrile aforementioned is not suitable for being applied, in the industrial production, without any modification because of the low percentage of yield of adiponitrile which is lower than 90% in the reaction carried out at a temperature over 30° C.

Secondly the inventors of the present invention have found the possibility of restraining the progress of cyanoethylation in the reaction with prominent effect by allowing the presence of organic halides in the reacting liquid aforementioned. Table II shows the results of tests wherein 1 part of dichloroethane is contained in the reacting liquid at the pH value held ranging from 9 to 11 and thereafter produced 0.8 part of adiponitrile at various temperatures at a reaction velocity double that obtained in the tests the results of which are shown in Table I.

TABLE II

| Reaction temperature in °C. | Quantity of— | | | Percent | |
|---|---|---|---|---|---|
| | Produced adiponitrile | Produced propionitrile | Produced biscyanoethyl ether | Amalgam efficiency | Yield of adiponitrile |
| 20 | 0.8 | 0.015 | Trace | 91 | 99 |
| 30 | 0.8 | 0.015 | 0.005 | 89 | 98 |
| 40 | 0.8 | 0.015 | 0.015 | 86 | 96 |

In these tests above-mentioned, the yield of adiponitrile was raised prominently even at the high value of pH of the reacting liquid in comparing with the yield of adiponitrile produced from the reacting liquid wherein no organic halide was contained as aforementioned. Only 0.002 part of sodium chloride were produced and consequently it was clarified that very small quantity of dichloroethane was distintegrated whereby the reaction for by-production of biscyanoethyl ether was reduced by the organic halide added to the reacting liquid.

When applying the process of the present invention in producing adiponitrile, it is possible to produce adiponitrile in better condition than in the conventional process so that the yield of adiponitrile will be remarkably raised up to 96% even in the reaction at the temperature of 40° C. The process of the present invention for producing adiponitrile is far superior to the conventional process using no dichloroethane in the reacting liquid wherein only 73% of the yield of adiponitrile is attained. Furthermore, easiness in accelerating the progress of the reaction in stabilized conditions at a larger reaction velocity than the reaction velocity offered by the conventional process affords advantages to the dissolving process of neutralizing carbon dioxide gas in the reacting liquid. Consequently the method of neutralization can be made more simplified than in the conventional process. It is considered that the action of the added organic halide in the reacting liquid is so prominently effective against appearance of partial reaction in the reacting liquid at high pH value that the added organic halide will act very efficiently in the production of adiponitrile on an industrial scale.

In the process of the present invention, the following organic halide compounds are used to obtain excellent results: Aliphatic hydrocarbons hydrogen atoms of which are replaced by halogen atoms, for example, dihalogenoethane, dihalogenopropane, dihalogenobutane, n-amyl halide, isobutyl halide, octyl halide and ethylidene halide. Among the above stated compounds, aliphatic hydrocarbons hydrogen atoms which are replaced by halogen atoms, the compounds denoted by a general formula $(HC_2)_n(X)_2$ are stable in the reaction and most preferable. However, other aliphatic hydrocarbons other than the formula above-mentioned are also applicable in the process of the present invention. As to the water soluble solvent of acrylonitrile in the process of this invention, the following compounds are applicable: Dimethylsulfoxide, N,N-dimethylformamide and 1,3 dimethylurea. Dimethylsulfoxide is useful for the catalyst in the reaction for producing adiponitrile. Also 1,3 dimethylurea is effective in catalytic action in the same reaction as above referred. Adding inhibitors to the reacting liquid makes no disturbance in the progress of the reaction.

Another merit of using the organic halide in the process of the present invention is to make it possible to separate most parts of the organic halide from the water soluble solvent by adding a small portion of water to the said reacting liquid whereby the products in the reaction such as adiponitrile, propionitrile and others are extracted. There can be used the same material for both the reacting liquid and extracting reagent. This enables us to prepare the reacting liquid with ease by adding the liquid obtained by fractional distillation in a form of a mixture of extracting reagent and acrylonitrile to the reacting liquid prior to the beginning of the process to separate the reaction products from the extracted liquid. Furthermore, dichloroethane boils at a relatively low temperature which can be used for separating and washing sodium bicarbonate produced by neutralization of the reacting liquid. When the organic halide is used in separating and washing the sodium bicarbonate, the wet cake of sodium bicarbonate containing the organic halide is dried in hot carbon dioxide gas and the carbon dioxide gas thus saturated with the organic halide can be directly used in neutralization of the reacting liquid. It is quite natural that the liquid containing the organic halide is effectively used in oppressing side reactions which may occur in partially alkaline parts of the reacting liquid even though the main reaction is to be maintained in the acid condition.

In the conventional process for producing adiponitrile, the reaction temperature was maintained lower than 30° C. or if possible lower than 25° C., and at the same time, the quantity of the produced adiponitrile contained in the reacting liquid was controlled to be in a range of lower concentration of less than 4% in order to keep the yield of the produced adiponitrile as high as possible by reducing the side reactions in cyanoethylation which lower the yield of adiponitrile produced by the main reaction. In the process of the present invention for producing adiponitrile, the yield of adiponitrile reached over 25% in concentration of produced adiponitrile in the reacting liquid by oppressing the reaction in cyanoethylation even when the reaction velocity was accelerated up to the doubled value of the reaction velocity in the conventional process. Such a fine result of producing adiponitrile was introduced by the merit of the process of the present invention to allow the organic halide being contained in the reacting liquid which made it possible to maintain the reaction at the same temperature applied in the conventional process or even at higher temperature up to 40° C. with the range of higher pH values than that of the conventional process. Cooling of the reacting liquid can be obtained at lower cost on an industrial scale when carbon dioxide gas is used in neutralization of the reacting liquid because the dissolving process is handled in an easier way and the method of absorption of carbon dioxide gas can be performed in a simpler way. It is very easy to hold the yield of adiponitrile over 95% even if the reaction chamber is small-sized and of simple structure in the stage of scale-up of the reaction into an industrial scale. Furthermore, application of the process for producing adiponitrile of the present invention in industry is of high value because of the possibility in rationally constructing the continous process of reaction and recovering reagents used in the reaction by taking into consideration the combination of the extracting reagent and the process for production of adiponitrile.

Examples in testing the process of the present invention will be explained in detail hereafter.

EXAMPLE 1

20 cc. of mercury and the reacting liquid were charged in a separable flask with a capacity of 500 cc. and with a central neck and 4 surrounding necks. The 4 surrounding necks on the lid of the flask were fixed with a thermometer, a blasting inlet tube for carbon dioxide gas, a dropping tube for amalgam and a condenser (outlet for gas) respectively. A stirrer was fixed in the central neck. The lid of the flask thereafter was fixed to the flask. The tips of the thermometer and blasting inlet tube for carbon dioxide gas were placed in the reacting liquid. The tip of the dropping tube for mercury was placed in the mercury charged in the flask. Carbon dioxide gas was introduced into the flask after being almost saturated with acrylonitrile at 20° C. by being flowed through a washing bottle filled with acrylonitrile. The stirrer fixed in the central part of the flask was continuously rotated at a rotating velocity of 300 r.p.m. from the beginning to the end of the reaction. The flask was placed in a water bath in order to maintain the reaction temperature by adjusting the temperature of water in the water bath. A mixture of reacting liquid consisting of the following constituents was charged in the flask:

| | G. |
|---|---|
| Dimethylsulfoxide | 46 |
| Acrylonitrile | 15 |
| Water | 12 |

818 g. of sodium amalgam containing 0.457% of sodium were continuously dropped into the reacting liquid over a period of 45 minutes with continuous stirring. Carbon dioxide gas was continuously supplied into the reacting liquid from the beginning to the end of the reaction to hold the pH value of the reacting liquid ranging from 9 to 11. The reaction temperature was adjusted to be maintained at a temperature ranging from 36° C. to 39° C. The reacting liquid was stirred for 6 minutes more after the completion of dropping the amalgam into the reacting liquid. Thereafter the content of the reaction flask was transferred to a separating funnel to separate the mercury from the reacting liquid. Water was added to the separated reacting liquid to dissolve sodium bicarbonate. Reaction products in the liquid were extracted by 20 cc. of methylene chloride and the extraction of the products was repeated for 6 times with 20 cc. of methylene chloride each time. The extract consisted of the following compounds:

| | | |
|---|---|---|
| Propionitrile | g | 0.13 |
| Adiponitrile | g | 7.41 |
| Biscyanoethyl ether | g | 2.75 |
| Polymerization product | | Trace |
| Amalgam efficiency | percent | 84 |
| Yield of adiponitrile per acrylonitrile in reaction [1] | do | ca. 72 |

[1] Hereinafter is called "Yield of adiponitrile."

The following experiments were performed in the same equipment and according to the same procedure as above mentioned.

EXAMPLE 2

The reaction liquid consisted of the following constituents:

| | G. |
|---|---|
| Dimethylsulfoxide | 30 |
| Acrylonitrile | 15 |
| Water | 12 |
| Dichloroethane | 20 |

919 g. of sodium amalgam containing 0.457% of sodium were dropped into the reacting liquid continuously over a period of 20 minutes with constant stirring of the contents of the reaction flask. The pH value of the reacting liquid was held ranging from 9 to 11 by introducing carbon dioxide gas into the reacting liquid from the beginning to the end of the reaction. The reaction temperature was adjusted to be maintained at a temperature ranging from 40° C. to 42° C. The reacting liquid was stirred for 6 minutes more after completion of dropping the amalgam into the reacting liquid. The reaction products were extracted by the same process as was described in Example 1. The extract was composed of the following compounds:

| | | |
|---|---|---|
| Propionitrile | g | 0.21 |
| Adiponitrile | g | 8.51 |
| Biscyanoethy ether | g | 0.15 |
| Polymerization | | Trace |
| Amalgam efficiency | percent | 86 |
| Yield of adiponitrile | do | ca. 69 |

EXAMPLE 3

The reacting liquid consisted of the following constituents:

| | G. |
|---|---|
| Dimethylsulfoxide | 30 |
| Acrylonitrile | 15 |
| Water | 12 |

802 g. of sodium amalgam containing 0.498% of sodium were dropped into the reacting liquid continuously over a period of 45 minutes with constant stirring of the content of the reaction flask. The pH value of the reacting liquid was held ranging from 9 to 11 by introducing carbon dioxide gas into the reacting liquid from the beginning to the end of the reaction. The reaction temperature was adjusted to be maintained ranging from 29° C. to 31° C. The reacting liquid was stirred for 6 minutes more after the completion of dropping the amalgam into the reacting liquid. Reaction products were extracted according to the same process as was described in Example 1. The extract was composed of the following compounds:

| | | |
|---|---|---|
| Propionitrile | g | 0.11 |
| Adiponitrile | g | 8.49 |
| Biscyanoethyl ether | g | 1.3 |
| Polymerization product | | Trace |
| Amalgam efficiency | percent | 90 |
| Yield of adiponitrile | do | 86 |

EXAMPLE 4

The reacting liquid consisted of the following constituents:

| | G. |
|---|---|
| Dimethylsulfoxide | 30 |
| Acrylonitrile | 15 |
| Water | 12 |
| 1,3 dichloropropane | 16 |

865 g. of sodium amalgam containing 0.498% of sodium were dropped into the reacting liquid continuously over a period of 20 minutes. The content of the reaction flask was stirred constantly from the beginning to the end of the reaction. The pH value of the reacting liquid was held ranging from 9 to 11 by introducing carbon dioxide gas into the reacting liquid. The reaction temperature was adjusted to be maintained ranging from 29° C. to 31° C. The reacting liquid was stirred for 6 minutes more after the completion of dropping the amalgam into the reacting liquid. Reaction products were extracted according to the same process as was described in Example 1. The extract was composed of the following compounds:

| | | |
|---|---|---|
| Propionitrile | g | 0.19 |
| Adiponitrile | g | 8.82 |
| Biscyanoethyl ether | g | 0.07 |
| Polymerization product | | Trace |
| Amalgam efficiency | percent | 87 |
| Yield of adiponitrile | do | 97 |

EXAMPLE 5

The reacting liquid consisted of the following constituents:

| | G. |
|---|---|
| Dimethylsulfoxide | 30 |
| Acrylonitrile | 15 |
| Water | 12 |

1,129 g. of sodium amalgam containing 0.397% of sodium were dropped into the reacting liquid continuously over a period of 45 minutes. The content of the reaction flask was stirred constantly from the beginning to the end of the reaction. The pH value of the reacting liquid was held ranging from 9 to 11 by introducing carbon dioxide gas into the reacting liquid. The reaction temperature was adjusted to be maintained at a temperature ranging from 20° C. to 23° C. The reacting liquid was stirred for 7 minutes more after the completion of the dropping of the amalgam into the reacting liquid. Reaction products were extracted according to the same process as was described in Example 1. The extract was composed of the following compounds:

| | | |
|---|---|---|
| Propionitrile | g | 0.11 |
| Adiponitrile | g | 9.59 |
| Biscyanoethyl ether | g | 0.71 |
| Polymerization product | | Trace |
| Amalgam efficiency | percent | 92 |
| Yield of adiponitrile | do | 92 |

EXAMPLE 6

The reacting liquid consisted of the following constituents:

| | G. |
|---|---|
| Dimethylsulfoxide | 30 |
| Acrylonitrile | 15 |
| Water | 12 |
| 1,2 dichloropropane | 10 |

1,131 g. of sodium amalgam containing 0.397% of sodium were dropped into the reacting liquid continuously over a period of 25 minutes. The reacting liquid was constantly stirred from the beginning to the end of the reaction. The pH value of the reacting liquid was held ranging from 9 to 11. The reaction temperature was adjusted to be maintained at a temperature ranging from 20° C. to 24° C. The reacting liquid was stirred for 7 minutes more after the completion of the dropping of the amalgam into the reacting liquid. The reaction products were extracted according to the same process as was described in Example 1. The extract thus obtained was composed of the following compounds:

| Propionitrile | g | 0.14 |
|---|---|---|
| Adiponitrile | g | 9.65 |
| Biscyanoethyl ether | | Not detected |
| Polymerization product | | Trace |
| Amalgam efficiency | percent | 92 |
| Yield of adiponitrile | do | 99 |

EXAMPLE 7

The reacting liquid consisted of the following constituents:

| | G. |
|---|---|
| Dimethylsulfoxide | 30 |
| Acrylonitrile | 15 |
| Water | 12 |
| Ethylidene dichloride | 15 |

798 g. of sodium amalgam containing 0.503% of sodium were dropped into the reacting liquid continuously over a period of 25 minutes. The content of the reaction flask was stirred constantly from the beginning to the end of the reaction. The pH value of the reacting liquid was held ranging from 9 to 11 by introducing carbon dioxide gas into the reacting liquid. The reaction temperature was adjusted to be maintained at a temperature ranging from 24° C. to 26° C. The reacting liquid was stirred for 10 minutes more after the completion of dropping the amalgam into the reacting liquid. The reaction products were extracted according to the same process as was described in Example 1. The extract thus obtained was composed of the following compounds:

| Propionitrile | g | 0.12 |
|---|---|---|
| Adiponitrile | g | 8.58 |
| Biscyanoethyl ether | g | 0.01 |
| Polymerization product | | Trace |
| Amalgam efficiency | percent | 91 |
| Yield of adiponitrile | do | 98 |

EXAMPLE 8

The reacting liquid consisted of the following constituents:

| | G. |
|---|---|
| Dimethylsulfoxide | 90 |
| Acrylonitrile | 30 |
| Water | 25 |

1,017 g. of sodium amalgam containing 0.432% of sodium were dropped into the reacting liquid continuously over a period of 50 minutes. The reacting liquid was constantly stirred from the beginning to the end of the reaction. The pH value of the reacting liquid was held ranging from 4 to 7 by introducing hydrochloric acid vapor into the reacting liquid. The reaction temperature was adjusted to be maintained at a temperature ranging from 40° C. to 42° C. The reacting liquid was stirred for 10 minutes more after the completion of dropping the amalgam into the reacting liquid. Reaction products were extracted according to the same process as was described in Example 1. The extract thus obtained was composed of the following compounds:

| Propionitrile | g | 0.23 |
|---|---|---|
| Adiponitrile | g | 8.67 |
| Biscyanoethyl ether | g | 0.87 |
| Polymerization product | | Trace |
| Amalgam efficiency | percent | 84 |
| Yield of adiponitrile | do | 89 |

EXAMPLE 9

The reacting liquid consisted of the following constituents:

| | G. |
|---|---|
| Dimethylsulfoxide | 90 |
| Acrylonitrile | 30 |
| Water | 25 |
| 1,2-dichloroethane | 13 |

1,017 g. of sodium amalgam containing 0.432% of sodium were dropped into the reacting liquid continuously over a period of 20 minutes in the same process to perform the reaction described in Example 8. The reaction products after being extracted were composed of the following compounds:

| Propionitrile | g | 0.21 |
|---|---|---|
| Adiponitrile | g | 8.97 |
| Biscyanoethyl ether | g | 0.01 |
| Polymerization product | | Trace |
| Amalgam efficiency | percent | 87 |
| Yield of adiponitrile | do | 98 |

EXAMPLE 10

The reacting liquid consisted of the following constituents:

| | G. |
|---|---|
| N,N-dimethylformamide | 40 |
| Acrylonitrile | 30 |
| Dimethylsulfoxide | 40 |
| Water | 25 |

1,030 g. of sodium amalgam containing 0.419% of sodium were dropped into the reacting liquid continuously for 60 minutes. The content of the reaction flask was constantly stirred from the beginning to the end of the reaction. The pH value of the reacting liquid was held ranging from 9 to 11. The reaction temperature was adjusted to be maintained at a temperature ranging from 28° C. to 31° C. The reacting liquid was stirred for 6 minutes more after the completion of dropping the amalgam into the reacting liquid. Reaction products were extracted according to the same process as was described in Example 1. The extract was composed of the following compounds:

| Propionitrile | g | 0.08 |
|---|---|---|
| Adiponitrile | g | 8.01 |
| Biscyanoethyl ether | g | 0.65 |
| Polymerization product | | Trace |
| Amalgam efficiency | percent | 79 |
| Yield of adiponitrile | do | 92 |

EXAMPLE 11

The reacting liquid consisted of the following constituents:

| | G. |
|---|---|
| N,N-dimethylformamide | 40 |
| Acrylonitrile | 30 |
| Dimethylsulfoxide | 40 |
| Water | 25 |
| Dichlorobutane | 12 |

1,046 g. of sodium amalgam containing 0.445% of sodium were dropped to react with the reacting liquid in the same process as was described in Example 10. The reacting temperature was adjusted to be maintained at a temperature ranging from 28° C. to 31° C. Reaction products were extracted according to the same process as was described in Example 1. The extract was composed of the following compounds:

| | |
|---|---|
| Propionitrile | g__ 0.12 |
| Adiponitrile | g__ 8.75 |
| Biscyanoethyl ether | g__ 0.02 |
| Polymerization product | Trace |
| Amalgam efficiency | percent__ 80 |

Yield of adiponitrile, ca. 98%.

EXAMPLE 12

The reacting liquid consisted of the following constituents:

| | G. |
|---|---|
| 1,3 dimethylurea | 40 |
| Dimethylsulfoxide | 40 |
| Acrylonitrile | 30 |
| Water | 20 |

1,357 g. of potassium amalgam containing 0.431% of potassium were dropped into the reacting liquid continuously over a period of 60 minutes. The content of the reaction flask was constantly stirred from the beginning to the end of the reaction. The pH value of the reacting liquid was held ranging from 9 to 11. The reaction temperature was adjusted to be maintained at a temperature ranging from 21° C. to 23° C. The reacting liquid was stirred for 10 minutes more after the completion of dropping the amalgam into the reacting liquid. Reaction products were extracted according to the same process as was described in Example 1. The extract thus obtained was composed of the following compounds:

| | |
|---|---|
| Propionitrile | g__ 0.11 |
| Adiponitrile | g__ 7.37 |
| Biscyanoethyl ether | g__ 0.35 |
| Polymerization product | Trace |
| Amalgam efficiency | percent__ 91 |
| Yield of adiponitrile | do____ 94 |

EXAMPLE 13

The reacting liquid consisted of the following constituents:

| | G. |
|---|---|
| 1,3 dimethylurea | 40 |
| Dimethylsulfoxide | 40 |
| Acrylonitrile | 30 |
| Water | 20 |
| Methylene dichloride | 10 |

1,420 g. of potassium amalgam containing 0.419% of potassium were dropped into the reacting liquid continuously over a period of 30 minutes to perform the reaction in accordance with the process as was described in Example 12. The reaction products after being extracted were composed of the following compounds:

| | |
|---|---|
| Propionitrile | g__ 0.10 |
| Adiponitrile | g__ 7.51 |
| Biscyanoethyl ether | Not detected |
| Polymerization product | Not detected |
| Amalgam efficiency | percent__ 91 |
| Yield of adiponitrile | do____ 99 |

EXAMPLE 14

The reacting liquid consisted of the following constituents:

| | G. |
|---|---|
| Dimethylsulfoxide | 50 |
| Acrylonitrile | 22 |
| Dichloroethane | 23 |
| Water | 17 |

1,027 g. of sodium amalgam containing 0.59% of sodium were dropped into the reacting liquid continuously over a period of 30 minutes. The content of the reaction flask was stirred from the beginning to the end of the reaction. The pH value of the reacting liquid was held ranging from 9 to 11. The reaction temperature was adjusted to be maintained at a temperature ranging from 35° C. to 40° C. The reacting liquid was stirred for 5 minutes more after the completion of dropping the amalgam into the reacting liquid. Thereafter the mercury was separated from the liquid. The separated liquid was filtered through a glass filter. The reaction flask was washed with the filtrate obtained in the process of filtration above-mentioned for 4 times. The washing filtrate was filtered after washing the reaction flask to separate the sodium bicarbonate produced in the reaction aforementioned. The residue on the funnel after filtration was washed with 20 cc. of acrylonitrile. The filtrate obtained in the said filtration was again transferred to the reaction flask. Composition of the transferred liquid in the reaction flask was determined by gas chromatography to contain the following components in the liquid:

| | G. |
|---|---|
| Dimethylsulfoxide | 49 |
| Acrylonitrile | 22 |
| Dichloroethane | 23 |
| Water | 17 |

1,335 g. of sodium amalgam containing 0.449% of sodium were continuously dropped into the rearranged liquid in the reacting flask over a period of 25 minutes. The reaction was performed in the same process of the first reaction as was described above. The reaction temperature was adjusted to be maintained at a temperature ranging from 35° C. to 40° C. The mercury was separated from the reacting liquid after completion of the reaction. The separated reacting liquid was filtered through the glass funnel which was used for separating the sodium bicarbonate in the first reaction and which held the separated sodium bicarbonate therein. The reacting flask was washed with the filtrate obtained in the filtration of sodium bicarbonate and all sodium bicarbonate produced was collected in the glass funnel by filtration of the washing filtrate after washing the reaction flask. Thereafter the reaction flask was washed 3 times with 10 cc. of dichloroethane each time. The dichloroethane used for washing the reaction flask was filtered through the glass funnel. The residue on the funnel was washed 3 times with 10 cc. of dichloroethane each time. The filtrate obtained in the process above-mentioned was transferred to a separating funnel and thereafter 50 cc. of water were added to the filtrate in the separating funnel. The layer of dichloroethane was separated by the separating funnel. Reaction products were extracted by adding 15 cc. of dichloroethane to the filtrate which was separated from the dichloroethane in the separating funnel. Extraction of reaction products was repeated for 5 times using 15 cc. of dichloroethane each time. The extract thus obtained was composed of the following compounds:

| | |
|---|---|
| Propionitrile | g__ 0.53 |
| Adiponitrile | g__ 25.8 |
| Biscyanoethyl ether | g__ 0.12 |
| Polymerization product | Trace |
| Amalgam efficiency | percent__ 91 |
| Yield of adiponitrile | do____ 97 |

The residue on the glass funnel was further washed 3 times with 20 cc. of dichloroethane each time. The washed residue was dried in a hot air dryer with heated air at 45° C. for 4 hours. The weight of dried residue reached a constant value of 42.5 g. The residue was analyzed, and it contained 98% of sodium bicarbonate and 1% of sodium carbonate.

What is claimed is:

1. In a process for the production of adiponitrile comprising reductively dimerising acrylonitrile in a solvent selected from the group consisting of dimethylsulfoxide, N,N-dimethylformamide and 1,3-dimethylurea in the presence of water and an alkali metal amalgam or an alkaline earth metal amalgam, the improvement which comprises that said solvent additionally contains a dichloride of a lower aliphatic hydrocarbon having 1 to 4 carbon atoms.

2. In the process according to claim 1 wherein the dichloride is the dichloride of a lower aliphatic hydrocarbon having 2 to 4 carbon atoms.

3. In the process according to claim 1 wherein the dichloride has the following structural formula $(CH_2)_n(Cl)_2$ wherein $n$ is an integral number from 1 to 4.

4. In the process according to claim 3 wherein $n$ is an integral number from 2 to 4.

5. In the process according to claim 1 wherein the pH value of the reacting liquid formed from the acrylonitrile, solvent and water ranges from 8 to 11.

6. In the process according to claim 3 wherein the pH value of the reacting liquid formed from the acrylonitrile, solvent and water ranges from 8 to 11.

References Cited

UNITED STATES PATENTS

| 3,519,674 | 7/1970 | Arad et al. | 260—465.8 A |
| 3,536,747 | 10/1970 | Mathis et al. | 260—465.8 A |
| 3,215,726 | 11/1965 | Sennewald et al. | 260—465.8 |
| 3,459,784 | 8/1969 | Littlehailes et al. | 260—465.8 |
| 3,479,386 | 11/1969 | Gregory | 260—465.8 |
| 3,489,789 | 1/1970 | Dewar et al. | 260—465.8 |

JOSEPH P. BRUST, Primary Examiner

U.S. Cl. X.R.

260—465.1, 465.6

UNITED STATES PATENT OFFICE
CERTIFICATE OF CORRECTION

Patent No. 3,641,105    Dated February 8, 1972

Inventor(s) Yasuhisa Hasiguchi and Sueo Kamada

It is certified that error appears in the above-identified patent and that said Letters Patent are hereby corrected as shown below:

Column 3, line 5, change "distintegrated" to -- disintegrated --

Column 3, line 39, change "$(HC_2)_n (X)_2$ to -- $(CH_2)_n (X)_2$ --

Column 5, line 52, change "Biscyanoethy" to -- Biscyanoethyl --

Column 5, line 55, change "69" to -- 96 --

Claim 1, column 10, line 72, change "produtcion" to -- production --

Signed and sealed this 8th day of August 1972.

(SEAL)
Attest:

EDWARD M. FLETCHER, JR.         ROBERT GOTTSCHALK
Attesting Officer                Commissioner of Patents